United States Patent
Degaleesan et al.

(10) Patent No.: US 9,878,298 B2
(45) Date of Patent: Jan. 30, 2018

(54) DISTRIBUTOR DEVICE FOR A MULTIPLE-BED DOWNFLOW REACTOR

(71) Applicant: SHELL OIL COMPANY, Houston, TX (US)

(72) Inventors: Sujatha Degaleesan, Katy, TX (US); Charles Eduard Dammis Ouwerkerk, Amsterdam (NL); Benoit Witkamp, Amsterdam (NL); Rachel Anna Worthen, Katy, TX (US)

(*) Notice: Subject to any disclaimer, the term of this patent is extended or adjusted under 35 U.S.C. 154(b) by 0 days.

(21) Appl. No.: 15/426,080

(22) Filed: Feb. 7, 2017

(65) Prior Publication Data

US 2017/0144122 A1 May 25, 2017

Related U.S. Application Data

(62) Division of application No. 14/366,722, filed as application No. PCT/EP2012/076438 on Dec. 20, 2012.

(30) Foreign Application Priority Data

Dec. 22, 2011 (WO) .................. PCT/US2011/066923

(51) Int. Cl.
*B01J 8/04* (2006.01)
*B01J 8/02* (2006.01)
*C10G 45/00* (2006.01)
*C10G 47/00* (2006.01)

(52) U.S. Cl.
CPC ........... *B01J 8/0492* (2013.01); *B01J 8/0242* (2013.01); *C10G 45/00* (2013.01); *C10G 47/00* (2013.01); *B01J 2208/027* (2013.01)

(58) Field of Classification Search
CPC .. B01J 8/0492; B01J 8/0242; B01J 2208/027; C10G 45/00; C10G 47/00
See application file for complete search history.

(56) References Cited

U.S. PATENT DOCUMENTS

| 3,353,924 A | 11/1967 | Riopelle |
| 3,880,961 A | 4/1975 | Alcock |
| 5,635,145 A | 6/1997 | Den Hartog et al. |

(Continued)

FOREIGN PATENT DOCUMENTS

| EP | 0716881 | * 6/1996 |
| EP | 1477222 | 11/2004 |

(Continued)

*Primary Examiner* — Randy Boyer
*Assistant Examiner* — Juan Valencia
(74) *Attorney, Agent, or Firm* — Charles W. Stewart

(57) ABSTRACT

The invention relates to a device and method for distributing a liquid and gas in a multiple-bed downflow reactor, such as a hydrocarbon processing reactor, like a hydrocracker. The device comprises respectively the method uses a distributor device comprising a substantially horizontal collecting tray provided with a central gas passage. Gas passing in downward direction through the central gas passage is forced into a swirling motion by a swirler. This swirling motion has a swirl direction around a vertical swirl axis so that the gas leaves the central gas passage as a swirl. At a location above the collecting tray, a quench fluid is ejected into gas in an ejection direction, which is, viewed in a horizontal plane, at least partly opposite to the swirl direction.

9 Claims, 3 Drawing Sheets

(56) References Cited

U.S. PATENT DOCUMENTS

| | | | |
|---|---|---|---|
| 7,112,312 B2 | 9/2006 | Chou | |
| 2004/0151643 A1 | 8/2004 | McDougald et al. | |
| 2004/0228779 A1* | 11/2004 | McDougald | B01J 8/0492 |
| | | | 422/605 |
| 2004/0234434 A1* | 11/2004 | Muldowney | B01J 8/0453 |
| | | | 422/224 |
| 2005/0163682 A1 | 7/2005 | Jacobs et al. | |

FOREIGN PATENT DOCUMENTS

| | | |
|---|---|---|
| JP | 2006341248 | 7/2008 |
| JP | 2008152103 | 7/2008 |

* cited by examiner

DISTRIBUTOR DEVICE FOR A MULTIPLE-BED DOWNFLOW REACTOR

This application is a divisional of U.S. application Ser. No. 14/366,722 filed Jun. 19, 2014, which is a National Stage (§371) International Application No. PCT/EP2012/076438 filed Dec. 20, 2012, which claims priority from International Application No. PCT/US2011/066923, filed Dec. 22, 2011, the disclosures of which are incorporated herein by reference.

The present invention relates to a distributor device for a multiple-bed downflow reactor, a multiple-bed downflow reactor comprising such a distributor device, use of such a distributor device and reactor, respectively, in hydrocarbon processing and a distributing method for distributing liquid and gas in a multiple-bed downflow reactor.

Multiple-bed downflow reactors containing a number of superimposed reaction beds are used in the chemical and petroleum refining industries for affecting various processes such as catalytic dewaxing, hydrotreating and hydrocracking. In these processes a liquid phase is typically mixed with a gas phase and the fluids pass over a particulate catalyst maintained in the reaction beds. As the fluids pass concurrently through a reaction bed, the distribution of liquid and gas across the reaction bed will tend to become uneven with adverse consequences with regard to the extent of reaction and also temperature distribution. In order to achieve a uniform distribution of liquid and gas and of temperature in the fluids entering the next lower reaction bed, a fluid distributor device, of which there are many different types, is usually placed between the reaction beds.

Such a fluid distributor device is known from EP-A-716881. This device discloses a fluid distributor device for use between the reaction beds of a multiple-bed downflow reactor. This known device comprises:
a substantially horizontal collecting tray provided with:
a central gas passage and
liquid passages around the central gas passage;
a swirler, which swirler:
is located above the collecting tray around the central gas passage, and
is provided with vanes defining a swirl direction and being arranged to impart a swirling motion to gas passing through the central gas passage so that the gas leaves the central gas passage as a swirl swirling in said swirl direction around a vertical swirl axis;
one or more ejection nozzles located above the collecting tray and arranged for ejecting, in an ejecting direction, a quench fluid into the gas before said gas enters the swirler.

During normal operation, liquid descending from the upper reaction bed collects on the collecting tray where it accumulates to form a layer of liquid that covers the liquid passages so that flow of gas through them is precluded. The flow of gas into a lower portion of the reactor is passed through the swirler located on the collecting tray above and around the central gas passage and subsequently through the central passage. On entering the swirler, vanes impart a swirling motion to the gas which is only able to move downwardly through the central gas passage into the mixing chamber below the collecting tray. The swirl direction of the swirl motion of the gas is defined by the vanes of the swirler and is around an essentially vertical swirl axis. The swirling motion of the gas promotes gas-gas interactions and thus equilibration of the gas phase. Liquid collected on the collecting tray passes through the liquid passages into the guide conduits. The guide conduits have injection nozzles injecting the liquid into the swirl of gas coming from the central gas passage. This liquid injected into the swirl leaves the injection nozzles in an injection direction.

In order to achieve a uniform distribution of liquid and gas and of temperature in the fluids entering the next lower reaction bed, a fluid distributor device, like the one of EP-A-716881 is frequently provided with one or more ejection nozzles to eject a quench fluid into the gas before it enters the swirler. For this purpose one of the embodiments of EP-A-716881 has a quench ring arranged above the collecting tray. The inner side of this quench ring is provided with a plurality of ejection nozzles. In use a quench fluid is ejected into the gas passing from the upper bed to the swirler. EP-A-716881 is silent about the ejection direction of the ejection nozzles. It can only be seen in the drawing that these ejection nozzles are arranged on the inner side of the quench ring and face in an inward direction of the quench ring. However, from practise it is known that, in order to prevent a pressure drop and consequently loss of energy, these ejection nozzles are directed in a horizontal plane, that the ejection direction is at an angle with respect to the radial extending between the ejection nozzle and the centre of the reactor such that the ejection direction is (partly) in the same direction as the swirl direction of the swirl imparted by the swirler.

The ejection direction of EP-A-716881—as well as the ejection direction of the present invention—can mathematically be represented by an arrow, called ejection vector. In turn this ejection vector of EP-A-716881—as well as the one of the present invention—can be represented by an orthogonal set of three vector components: a radial ejection vector extending perpendicular to the swirl axis, an axial ejection vector extending parallel to the swirl axis and a tangential ejection vector extending tangentially with respect to the swirl axis. Taking into account this representation, the ejection direction of EP-A-716881 as known from practise—as described in the preceding paragraph—can be represented as follows: axial ejection vector has a length zero (meaning it is absent) as the ejection is in horizontal direction; the radial ejection vector is, viewed from the ejection nozzle, directed towards the centre of the reactor (which corresponds to the swirl axis); and the tangential ejection vector is, viewed from the ejection nozzle, directed in the same direction as the swirl direction.

The object of the invention is to provide an improved distributor device according to the preamble of claim 1.

This object is according to a first aspect of the invention achieved by providing a distributor device for distributing liquid and gas in a multiple-bed downflow reactor;
wherein the distributor device comprises:
a substantially horizontal collecting tray provided with:
a central gas passage and
liquid passages around the central gas passage;
a swirler, which swirler:
is located above the collecting tray around the central gas passage, and
is provided with vanes defining a swirl direction and being arranged to impart a swirling motion to gas passing through the central gas passage so that the gas leaves the central gas passage as a swirl swirling in said swirl direction around a vertical swirl axis;
one or more ejection nozzles located above the collecting tray and arranged for ejecting, in a ejecting direction, a quench fluid into the gas before said gas enters the swirler;
wherein the ejection direction is represented in an orthogonal set of three ejection vectors comprised of a radial ejection vector extending perpendicular to the swirl axis, an axial ejection vector extending parallel to the swirl axis and a tangential ejection vector extending tangentially with respect to the swirl axis; and wherein the ejection nozzle is directed such that the tangential ejection vector of the ejection direction of the ejected quench fluid is directed opposite to the swirl direction. As the tangential ejection vector is directed in a direction, it is represented by an arrow having a length larger than zero (i.e. the tangential ejection vector is larger than zero).

The tangential ejection vector being directed opposite to the swirl direction, means that the ejection direction is, viewed in a horizontal plane, at least partly counterflow to the swirl direction. Due to the ejection direction being partly opposite the swirl direction, a pressure drop and loss of energy will occur. The expected result would therefore be a decrease of the performance of the reactor provided with the invented distributor device. However, experiments showed the opposite.

The performance of a first reactor provided with a first distributor device according to EP-A-716881—having, as known from practise, the ejection direction in a horizontal plane at such an angle with respect to the radial that the radial ejection vector is directed towards the centre of the reactor and the tangential ejection vector directed in the same direction as the swirl direction—was compared with the performance of the same first reactor provided with a second distributor device which was, except for the direction of the ejection nozzles, the same as the first distributor device. The quench fluid was in both cases a hydrogen gas having a temperature lower than the temperature of the fluid into which it is ejected. Comparative computational model studies revealed, that, at the (horizontal) level where the fluid enters into the bed following the distributor device, applying the invention results, viewed in a horizontal plane, in a 50% reduction of the standard deviation of fluid temperature across the catalyst bed. This standard deviation is in this application also called the 'exit standard deviation'. Reduction of this standard deviation reduces the catalyst deactivation and makes it possible for the reactor to continue longer in operation. Taking into account that extension of the operation with one day can be equivalent to an increase in profit of about one million euro, reduction of this standard deviation is of very significant importance.

With respect to the ejection nozzle, it is noted that during normal use, the stream of fluid emerging from a ejection nozzle will, according to the invention, in general be a gas stream, but it is according to the invention not excluded that the stream is a mixture of a liquid and a gas. In the field of hydrocarbon processing, the quench fluid is in general gaseous hydrogen optionally comprising light carbons as an additive. Further, with respect to the ejection nozzle, it is noted that the stream emerging from this nozzle in said ejection direction can be a jet-shaped, fan-shaped, cone-shaped, etcetera. The ejection direction will be the main direction.

According to a further embodiment of the distributor device according to according to the first aspect of the invention, the ejection nozzle is directed such that the radial ejection vector of the ejection direction is directed to the swirl axis. As the radial ejection vector is in this embodiment directed in a direction, it is represented by an arrow having a length larger than zero (i.e. the radial ejection vector is larger than zero). The radial ejection vector being directed towards the swirl axis, means that the ejection direction is, viewed in a horizontal plane, not fully, but partly, in counterflow to the swirl direction. This improves the homogeneity of the temperature across the swirl, assumedly because the ejected quench fluid is better capable of reaching the centre of the swirl.

Simulative calculations show, that reduction of the so called 'exit standard deviation' is obtained already when the ejection direction and associated radial injection vector of a said injection nozzle define an angle of more than 2.5°, such as at least 5°, and that this reduction becomes considerable when this angle is at least 7.5°, such as at least 10°. Simulative calculations further show that the effect of the reduction of said 'exit standard deviation' appears to disappear when this angle becomes larger than 35°, and that the considerable reduction of said 'exit standard deviation' appears to diminish when this angle becomes larger than 30°.

According to a further embodiment of the distributor device according to the first aspect of the invention, the ejection direction and associated radial ejection vector of a said ejection nozzle consequently define an angle in the range of [5°, 35°], such as in the range of [7.5°, 30°] or in the range of [7.5°, 25°], like in the range of [15°, 25°]. It is noted here that, throughout this application, the indications '[' and ']' mean that the respective value is included in the range, and the indication ',' 'up to'.

With respect to the angles between the ejection direction and associated radial ejection vector, it is noted that these are expressed in degrees, wherein 360° corresponds with a circle.

According to a further embodiment of the distributor device according to the first aspect of the invention, the distributor device further comprises a mixing chamber defined between the collecting tray and the distribution tray.

According to a further embodiment of the distributor device according to the first aspect of the invention, the central gas passage is surrounded by a weir. This weir prevents liquid from entering into the gas passage.

According to a further embodiment of the distributor device according to the first aspect of the invention, the distributor device further comprises a cover located above the central gas passage and covering the entire central gas passage. This cover prevents fluid from approaching the central gas passage in a vertical downward direction.

According to a further embodiment of the distributor device according to the first aspect of the invention, the distributor device comprises one or more guide conduits arranged below the collecting tray, wherein the guide conduits have first ends communicating with the liquid passages of the collecting tray for receiving liquid; and second ends provided with an injection nozzle arranged to inject, in an injection direction, liquid received by the first ends into the swirl. Like the ejection direction of the ejection nozzles, also the injection direction of the injection nozzles can be defined as an orthogonal set of three injection vectors comprised of a radial injection vector extending perpendicular to the swirl axis, an axial injection vector extending parallel to the swirl axis and a tangential injection vector extending tangentially with respect to the swirl axis.

With respect to the terms 'injection' and 'ejection' as used in this application, it is noted that these are not intended to have physically a different meaning, these different terms are only intended to differentiate between what is associated to the swirl (the term 'injection') and quench (the term 'ejection'). Further, with respect to the injection nozzle, it is noted that the stream emerging from this nozzle in said injection direction can be a jet-shaped, fan-shaped, cone-shaped, etcetera. The injection direction will be the main direction.

According to a further embodiment of the distributor device according to the first aspect of the invention, the distributor device further comprises a substantially horizontal pre-distribution tray arranged below the central gas passage, above the distribution tray, and, in case present, lower than the optional injection nozzles of the one or more guide conduits, which pre-distribution tray is provided with an overflow weir at its perimeter and a plurality of openings near the perimeter.

According to a further embodiment of the distributor device according the first aspect of to the invention, the one or more guide conduits comprise at least eight guide conduits distributed around the central gas passage.

According to a further embodiment of the distributor device according the first aspect of to the invention, the injection nozzles of the one or more guide conduits are arranged to lie within the same horizontal plane According to a further embodiment of the distributor device according to the invention, the one or more ejection nozzles comprise a plurality of nozzles arranged around the swirl axis to lie within the same horizontal plane.

According to a further embodiment of the distributor device according the first aspect of the invention, the distributor device further comprises a substantially horizontal distribution tray located below the collecting tray, which distribution tray is provided with a plurality of downcomers for downward flow of liquid and gas; each downcomer optionally comprising an upstanding, open ended tube having an aperture at its side for entry of liquid into the tube.

According to a further embodiment of the distributor device according the first aspect of to the invention, the ejection nozzles are arranged to lie within the same horizontal plane. This same horizontal plane can according to an additional embodiment lie, viewed in vertical direction, at the same level as the vanes.

According to a second aspect, the invention also relates to a multiple-bed downflow reactor comprising vertically spaced beds of solid contact material, e.g. a catalyst, and a distributor device positioned between adjacent beds, wherein the distributor device is according to the first aspect of this invention.

According to a third aspect, the invention relates to the use of a distributor device according to the first aspect of the invention in hydrocarbon processing, such as in a hydrotreating and/or hydrocracking process.

According to a fourth aspect, the invention relates to the use of a downflow reactor according to the second aspect in hydrocarbon processing, such as in a hydrotreating and/or hydrocracking process.

According to a fifth aspect, the invention relates to a distributing method for distributing liquid and gas in a multiple-bed downflow reactor, such as a hydrocarbon processing reactor, like a hydrocracker;

wherein a distributor device is used, which distributor device comprises a substantially horizontal collecting tray provided with a central gas passage;

wherein gas passing in downward direction through the central gas passage is forced into a swirling motion having a swirl direction around a vertical swirl axis so that the gas leaves the central gas passage as a swirl;

wherein liquid is collected on the collecting tray;

wherein, at a location above the collecting tray and before the gas enters the swirler, a quench fluid, like a gaseous quench fluid, is ejected into said gas in an ejection direction, which is, viewed in a horizontal plane, at least partly opposite to the swirl direction.

According to a further embodiment of the fifth aspect, the ejection direction is represented in an orthogonal set of three ejection vectors comprised of a radial ejection vector extending perpendicular to the swirl axis, an axial ejection vector extending parallel to the swirl axis and a tangential ejection vector extending tangentially with respect to the swirl axis; wherein the tangential ejection vector is directed opposite to the swirl direction. In this embodiment, the radial ejection vector may be directed to the swirl axis.

According to still a further embodiment of the fifth aspect, the ejection direction and associated radial ejection vector define an angle in the range of [5°, 35°], such as in the range of [7.5°, 30°], like in the range of [7.5°, 25°] or in the range of [15°, 25°].

The invention will now be further described by way of example with reference to the accompanying drawings in which.

In the drawings like parts are denoted by like reference numerals.

Figure 1:
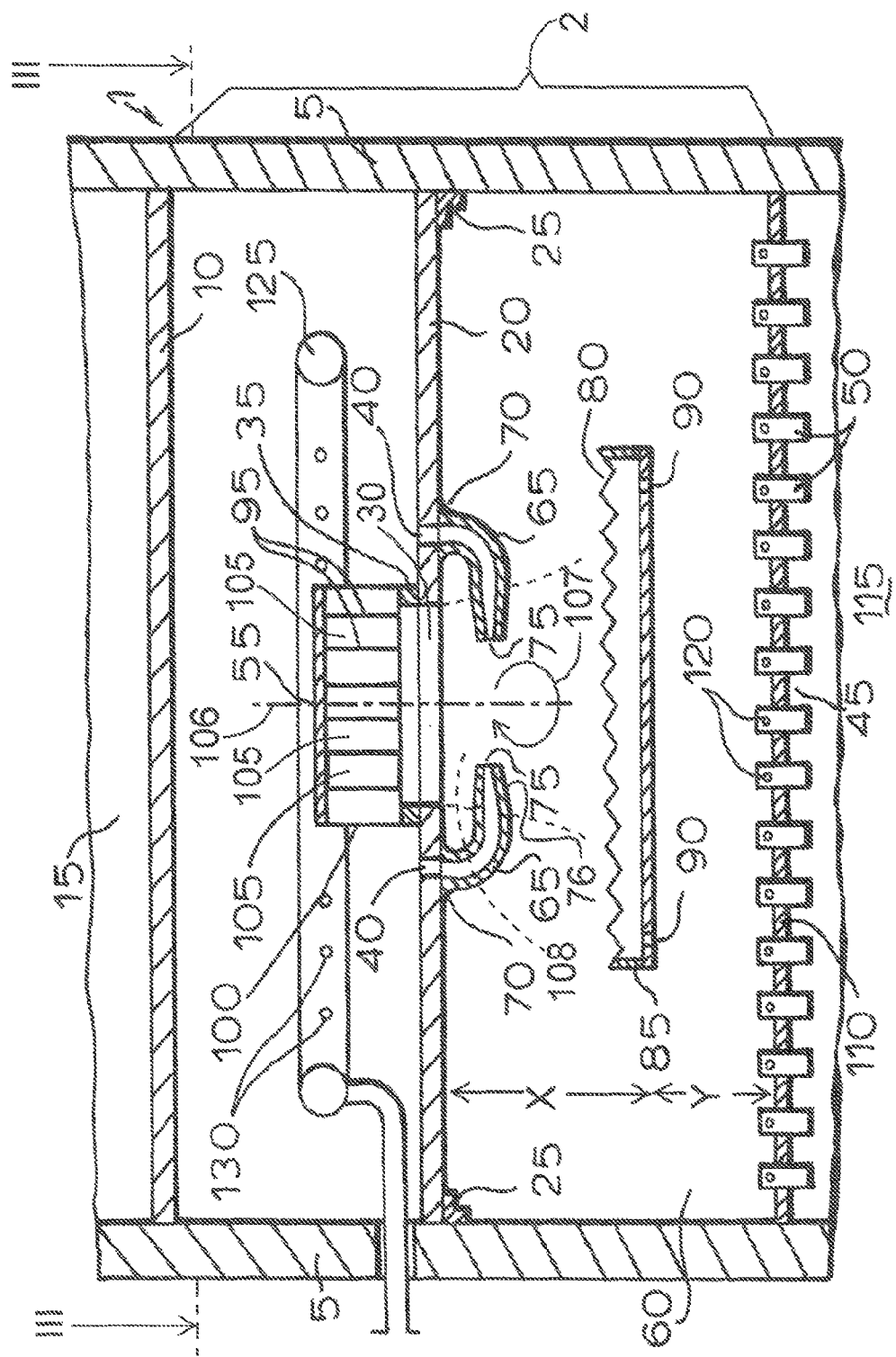
FIG. 1 shows schematically a vertical cross-section of a portion of a multiple bed downflow reactor with a distributor device according to the invention.

FIG. 1 shows a cross-sectional view through the portion of a multiple bed downflow reactor in the region between an upper bed 15 and a lower bed 115. This region between the upper bed 15 and lower bed 115 is provided with a distributor device 2. The general configuration of the reactor will be conventional and details such as supports for the distribution tray are not shown for purposes of clarity.

In this embodiment, the wall 5 of the reactor 1 and the support grid 10 support an upper reaction bed 15 of solid contact material, e.g. catalyst, in particulate form, over which catalyst reactants flow and are at least partially converted into product. The support grid 10 is provided with passages (not shown) and may be of conventional type. Catalyst may be directly arranged on the support grid 10 or the catalyst may be arranged on a layer of support balls (not shown) which permit liquid and gas to flow downwardly out of the upper bed 15 and through the support grid 10, which support balls are arranged on the support grid 10.

The distributor device 2 comprises a substantially horizontal collecting tray 20 supported on a ledge 25 which is provided with a central gas passage 30 surrounded by a weir 35 and with liquid passages 40 around the weir 35. A substantially horizontal distribution tray 45 located below the collecting tray 20. The distribution tray 45 is provided with a plurality of tubular downcomers 50 for downward flow of liquid and gas. A cover 55 is located above the central gas passage 30 of the collecting tray 20 and covers the entire central gas passage, so that gas coming from the upper bed 15 is prevented from axially approaching the central gas passage 30. A mixing chamber 60 is defined between the collecting tray 20 and the distribution tray 45. Guide conduits 65 having first ends 70 and second ends 76 are arranged below the collecting tray 20. The first ends 70 of the guide conduits 65 communicate with the liquid passages 40 of the collecting tray 20 in order to receive liquid collected by the collecting tray 20. Each second ends 76 is provided with an injection nozzle 75 opening into the mixing chamber 60.

The distributor device 2 further comprises a substantially horizontal pre-distribution tray 80 arranged between the guide conduits 65 and the distribution tray 45, which pre-distribution tray 80 is provided with an overflow weir 85 at its perimeter and a plurality of openings 90 near the perimeter.

During normal operation, liquid descending from the upper reaction bed 15 collects on the collecting tray 20 where it accumulates to form a layer of liquid that covers the liquid passages 40 so that flow of gas through them is precluded. The flow of gas into a lower portion of the reactor 1 is via a swirler 100 closed at its top by the cover 55. The swirler is provided with vertical vane members 95 and with horizontal gas passages 105 between the vane members 95. Gas descending from the upper reaction bed 15 is deflected off by the cover 55 and flows first radially outwards and then radially inwards towards the horizontal gas passages 105 of the swirler 100. On entering the horizontal gas passages, the vane members 95 arranged alongside the horizontal gas passages 105 impart a swirling motion to the gas which is only able to move downwardly through the central gas passage 30 into the mixing chamber 60 below. The swirling motion imparted results in that, at the lower side of the collecting tray 20, the gas leaves the central gas passage 30 as a swirl 108 swirling in a swirl direction 107 around a vertical swirl axis 106. The swirling direction 107 is defined by the vane members 95, and can be in the swirl direction 107 as indicated in FIG. 1 or in the opposite direction. The swirling motion of the gas promotes gas-gas interactions and thus equilibration of the gas phase.

The liquid on the collecting tray 20 passes through the liquid passages 40 and into and through the guide conduits 65. For the purposes of clarity only two guide conduits 65 and corresponding liquid passages 40 are shown in FIG. 1. The injection nozzles 75 at the second ends 76 of the guide conduits 65 are so positioned that, during normal operation, liquid streams emerging from the injection nozzles 75 are injected, at a location below the collecting tray 20, into the swirl 108 of gas coming from the central gas passage 30.

Liquid from the guide conduits 65 accumulates on the pre-distribution tray 80 where it passes downwardly to the distribution tray 45 beneath through the openings 90 or, sometimes, by breaching the overflow weir 85. The vertical distance (X) between the collecting tray 20 and the pre-distribution tray 80, and the vertical distance (Y) between the pre-distribution tray 80 and the distribution tray 45 are preferably related such that X/Y is in the range from 1 to 3. Gas is deflected by the pre-distribution tray 80 and flows to the distribution tray 45.

The distribution tray 45 serves two purposes. Firstly, it evenly distributes liquid and gas before the fluids enter a lower reaction bed 115 and, secondly, it allows contact between liquid and gas to provide liquid-gas interaction.

The distribution tray 45 comprises a substantially horizontal plate 110 with a large number of tubular downcomers 50 to provide many points of distribution of liquid and gas over the lower reaction bed 115. Each downcomer 50 comprises an upstanding (substantially vertical), open-ended tube which extends through an opening in the plate 110. Each tube has an aperture 120 (or apertures) in its side for entry of liquid into the tube which aperture 120 is positioned below the top surface of the pool of liquid which forms on plate 110 during normal operation. The total number and size of the apertures 120 will be selected according to the desired flow rate. Gas enters the top of the downcomer 50 and passes through it down to the lower reaction bed 115. In the downcomers 50 intimate mixing between gas and liquid phases occurs.

The distributor device further comprises means for distributing a quench fluid. These means comprise a quench ring 125 provided with ejection nozzles 130. The quench ring 125 is located between the support grid 10 and the collecting tray 20.

During normal operation, quench fluid can be emitted into the reactor through ejection nozzles 130 of the quench ring 125 where it comes into contact with liquid and gas descending from the upper reaction bed 15. The quench fluid may be a reactant (e.g. hydrogen gas in a hydrotreating or hydrocracking process), a product of the process or an inert material.

Figure 2:
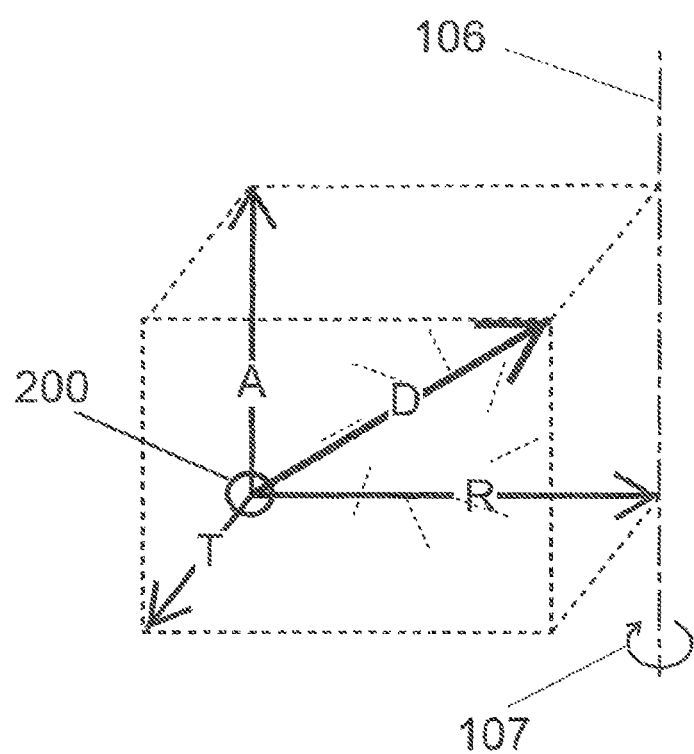
FIG. 2 shows schematically a 3-dimensional representation of a vector defined by a set of three orthogonal vector components.

Prior to more specifically discussing details of the invention, we will first discuss FIG. 2 in order to explain some general mathematical background used to define the invention.

Physical entities like forces, movements, speeds, directions etcetera can, in a 3D (three dimensional) environment, be expressed as a vector, like direction vector D in FIG. 2. Such a 3D-vector can be decomposed into vector components, one vector component for each dimension of the 3D environment. So vector D is represented in so to say three vector components. The sum of these tree vector components then is vector D. A 3D environment can as such be created in several manners. A manner frequently used is the 3D environment defined by an orthogonal set of three vector components. In such an orthogonal set of three vector components, each vector component extends perpendicular with respect to both other vector components. Doing so with the direction vector D in FIG. 2, this direction vector D can be decomposed into a first vector component R, a second vector component A perpendicular to vector component R, and a third vector component T perpendicular to both the vector component R and vector component A.

For the purpose of defining the present invention, the vector components R, T and A are related to the swirling motion of gas in the mixing chamber 60. This results in:

a radial vector component R—called in claim 1 the radial ejection vector—extending from the beginning of vector D to the swirl axis 106 and being perpendicular to the swirl axis 106;

an axial vector component A—called in claim 1 the axial ejection vector—extending parallel to the swirl axis 106 and perpendicular to the radial vector component R;

a tangential vector component T—called in claim 1 the tangential ejection vector—extending in tangential direction of the swirl and perpendicular to both the radial vector component R and the axial vector component A.

Further referring to FIG. 2 and claim 1: the circle 200 represents very schematically the surface opening of a nozzle (which surface has a normal vector perpendicular to said surface which coincides with the arrow D) and arrow D represents the direction of the fluid stream—called in claim 1 the ejection direction—emerging from the nozzle 200. In FIG. 2 also the swirl direction 107 has been indicated as a circular arrow around swirl axis 106. As one can see in FIG. 2, the tangential ejection vector is directed opposite to the swirl direction 107. The ejection direction D thus is partly opposite to the swirl direction and—neglecting axial movement in the swirl and centrifugal effects in the swirl—the tangential ejection vector is opposite the swirl direction. Viewed at the location of the nozzle 200, this tangential ejection vector T thus is so to say counter-flow to the swirl at the location of the nozzle 200.

Figure 3:
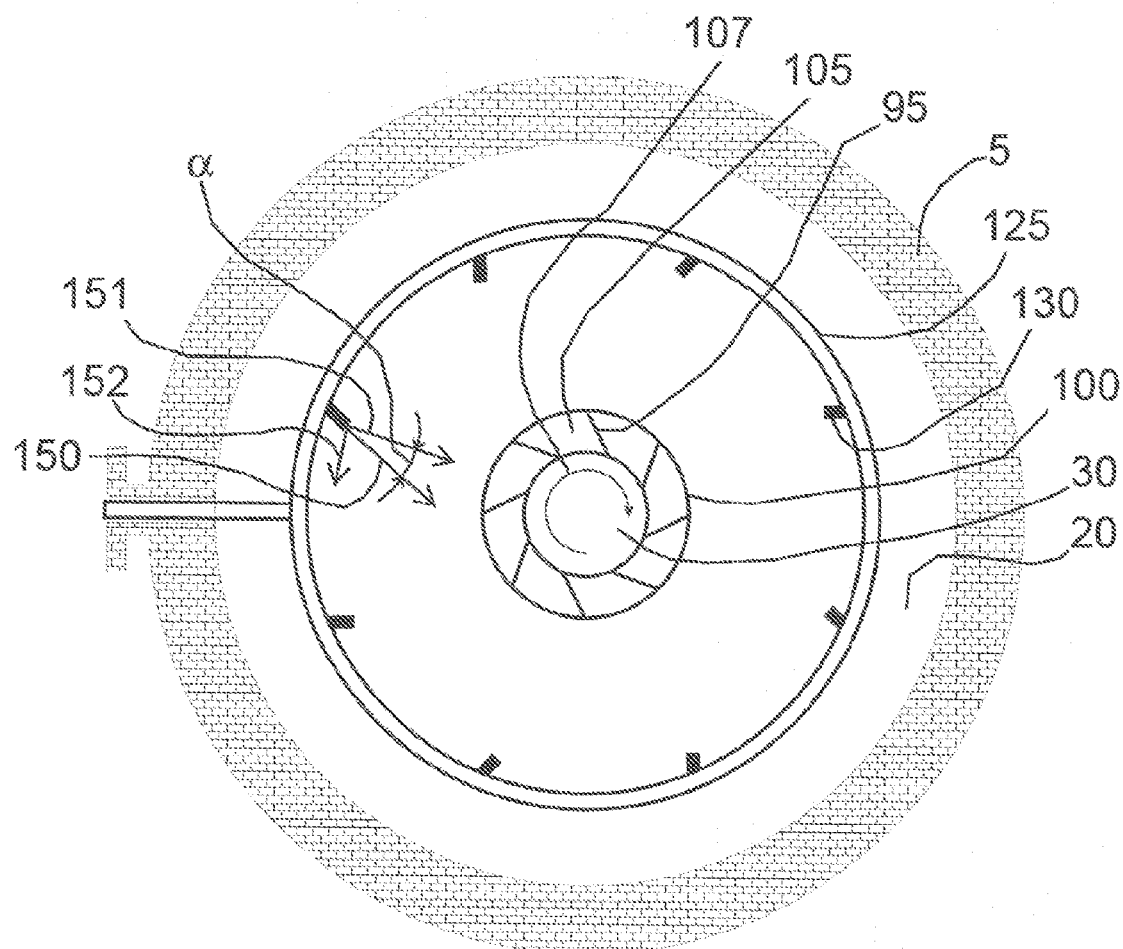
FIG. 3 shows a view, according to arrows III in FIG. 1, onto the collecting tray 20.

Now, more detailed turning to the invention, FIG. 3 shows a view, according to arrows III of FIG. 1, onto the collecting tray 20. This view shows the circular quench ring 125, the ejection nozzles 130, the swirler 100 with vanes 95 determining the swirl direction 107, the direction 150 of streams emerging from the ejection nozzles 130 (which direction is called the 'ejection direction' 150, compare also arrow D in FIG. 2), the radial component 151 of the ejection direction 150 (which radial component is called the 'radial ejection vector' 151, compare also arrow R in FIG. 2), the tangential component 152 of the ejection direction 150 (which tangential component is called the 'tangential ejection vector' 152, compare also arrow T in FIG. 2), and—viewed in the horizontal plane—the angle α of the ejection direction 150 with respect to the radial ejection vector 151. Taking into account, that the ejection direction 150 is in the embodiment of FIGS. 1 and 3 actually in the horizontal plane, the angle α is the same as the angle between the radial ejection vector 151 and the actual ejection direction 150 (note: the so called axial ejection vector—compare arrow A in FIG. 2—is in this case absent as it has a value zero due to the ejection direction being in the horizontal plane (which is the plane defined by the radial and tangential ejection vectors 150, 151, R, T).

As mentioned before, applicant found that directing the ejection direction 150 of the ejection nozzles 130 at least partly opposite the swirl direction, results in:

viewed in a horizontal plane, an improved homogeneity of the temperature across the swirl; and a reduction of the standard deviation of the temperature of the fluid across the reactor at the (horizontal) level of the horizontal distribution tray 45 where the fluid enters the bed 115 following the distributer device 2 (which standard deviation will be called the 'exit standard deviation').

With a horizontal ejection direction 150 at an angle α=−20° (i.e. at least partly in the same direction as the swirl direction) and α=20° with respect to the radial ejection vector 151 (i.e. at least partly opposite the swirl direction), simulative calculations on a real live hydrocracker reactor—having the liquid phase switched off—show that the so called 'exit standard deviation' is at α=20° about 50% smaller than at α=−20° when a gas is used as quench. Also for α=−10° and α=10°, simulative calculations show that the 'exit standard deviation' is at α=10° about 50% smaller than at α=−10° when a gas is used as a quench. This results in a longer use (about 1 month longer) of the reactor before maintenance for new catalyst replacement is necessary. The so called 'exit standard deviation' appears to be reduced for α≥5° and α≤35° (thus α=[5°, 35°]), such as for α is in the range of [5°, 25°]. An explanation for this reduction of the 'exit standard deviation' when the ejection direction is at least partly opposite the swirl direction, might be that due to opposite injection of the quench gas entering the swirler 100, the interactions between hot process gasses and the cold quench gasses are improved.

Taking into account that the swirl axis 106 will, in practical embodiments, coincide with the vertical centre axis of the central gas passage 30, the swirl axis 106 as used throughout this application can—in practical embodiments—be read as 'vertical centre axis of the central gas passage'.

The invention claimed is:

1. A distributor device for distributing liquid and gas in a multiple-bed downflow reactor;
   wherein the distributor device comprises:
      a substantially horizontal collecting tray provided with:
         a central gas passage and
         liquid passages around the central gas passage;
      a swirler which swirler:
         is located above the collecting tray around the central gas passage, and
         is provided with vanes defining a swirl direction and being arranged to impart a swirling motion to gas passing through the central gas passage so that the gas leaves the central gas passage as a swirl swirling in said swirl direction around a vertical swirl axis;
      one or more ejection nozzles located above the collecting tray and arranged for ejecting, in an ejecting direction, a quench fluid into the gas before said gas enters the swirler;
      wherein the ejection direction is represented in an orthogonal set of three ejection vectors comprised of a radial ejection vector extending perpendicular to the swirl axis, an axial ejection vector (A) extending parallel to the swirl axis and a tangential ejection vector extending tangentially with respect to the swirl axis;
      characterized, in that the ejection nozzle is directed such that the tangential ejection vector, (T) of the ejection direction of the ejected quench fluid is directed opposite to the swirl direction.

2. The distributor device according to claim 1, wherein the ejection nozzle is directed such that the radial ejection vector of the ejection direction of the quench fluid is directed to the swirl axis.

3. The distributor_device according to claim 1, wherein the ejection direction and associated radial ejection vector of a said ejection nozzle define an angle of more than 5°.

4. The distributor device according to claim 1, wherein the ejection direction and associated radial ejection vector of a said ejection nozzle define an angle of at least 10°.

5. The distributor device according to claim 1, wherein the ejection direction and associated radial ejection vector of a said ejection nozzle define an angle of at most 35°.

6. The distributor device according to claim 1, wherein the ejection direction and associated radial ejection vector of a said ejection nozzle define an angle of at most 30°.

7. The distributor device according to claim 1, wherein the ejection direction and associated radial ejection vector of a said ejection nozzle define an angle in the range of [5°, 35°].

8. The distributor device according to claim 1, wherein:
   the distributor device further comprises a mixing chamber defined between the collecting tray and the distribution tray; and/or
   the central gas passage is surrounded by a weir;
   the distributor device further comprises a cover located above the central gas passage and covering the entire central gas passage; and/or
   the distributor device further comprises a substantially horizontal pre-distribution tray arranged below the central gas passage, above the distribution tray and, in case present, lower than the optional injection nozzles of the optional one or more guide conduits, which pre-distribution tray is provided with an overflow weir at its perimeter and a plurality of openings near the perimeter; and/or
   one or more guide conduits arranged below the collecting tray (20), wherein the guide conduits have: first ends communicating with the liquid passages (40) of the collecting tray for receiving liquid; and
   second ends provided with an injection nozzle arranged to inject, in an injection direction, liquid received by the first ends into said swirl; wherein optionally
   the one or more guide conduits comprise at least eight guide conduits distributed around the central gas passage; and/or
   the injection nozzles of the one or more guide conduits are arranged to lie within the same horizontal plane; and/or the distributor device further comprises a substantially horizontal distribution tray located below the collecting tray, which distribution tray is provided with a plurality of downcomers for downward flow of liquid and gas; each downcomer optionally comprising an upstanding, open ended tube having an aperture at its side for entry of liquid into the tube; and/or the one or more ejection nozzles comprise a plurality of ejection nozzles arranged around the swirl axis to lie within the same horizontal plane.

9. A multiple-bed downflow reactor comprising vertically spaced beds of solid contact material and a distributor device positioned between adjacent beds, wherein the distributor device is as defined in claim 1.

* * * * *